United States Patent [19]

Pigeon

[11] Patent Number: 5,716,188
[45] Date of Patent: Feb. 10, 1998

[54] TOWING APPARATUS WITH MULTIPLE ADJUSTMENTS WHEEL RETAINERS

[76] Inventor: Norbert Pigeon, 1715 rue du Moulin, Ste-Madeleine (Québec), Canada, J0H 1S0

[21] Appl. No.: 579,988

[22] Filed: Dec. 28, 1995

[51] Int. Cl.⁶ .................................................. B60P 3/12
[52] U.S. Cl. .................................................. 414/563
[58] Field of Search .......................... 414/426, 429, 414/563; 280/402

[56] References Cited

U.S. PATENT DOCUMENTS

| | | | |
|---|---|---|---|
| 3,182,829 | 5/1965 | Wagner | 414/563 |
| 3,285,443 | 11/1966 | Gaumont | 414/563 |
| 3,434,607 | 3/1969 | Nelson | 414/563 |
| 3,434,608 | 3/1969 | Nelson | 414/563 |
| 3,690,482 | 9/1972 | Gaumont | 414/563 |
| 3,924,763 | 12/1975 | Piegeon | 414/563 |
| 3,951,280 | 4/1976 | Peck | 414/563 |
| 4,384,817 | 5/1983 | Peterson | 414/563 |
| 4,473,334 | 9/1984 | Brown | 414/563 |
| 4,573,857 | 3/1986 | Porter, Sr. et al. | 414/563 |
| 4,637,623 | 1/1987 | Bubik | 414/563 |
| 4,679,978 | 7/1987 | Holmes et al. | 414/563 |
| 4,793,763 | 12/1988 | Bubik | 414/563 |
| 4,836,737 | 6/1989 | Holmes et al. | 414/563 |
| 4,871,291 | 10/1989 | Moore et al. | 414/563 |
| 4,890,972 | 1/1990 | Nekola et al. | 280/402 X |
| 4,968,052 | 11/1990 | Alm et al. | 280/402 |
| 4,986,720 | 1/1991 | Holmes et al. | 414/563 |
| 4,993,909 | 2/1991 | Hamman | 414/563 |
| 5,391,044 | 2/1995 | Young | 414/563 |
| 5,575,606 | 11/1996 | Kiefer et al. | 414/563 |

*Primary Examiner*—James W. Keenan

[57] ABSTRACT

This invention relates to a towing apparatus for towing a disabled automobile. The towing apparatus includes an elongated boom having at each end portion a large rectangular aperture. A generally L-shaped wheel support member is also provided, having an elongated arm and a transverse wheel retainer forming an arcuate sheet. The cross-sectional width of the wheel support arm is substantially smaller than the width of the enlarged aperture of the elongated boom, so that the wheel support arm be freely engageable transversely through the boom enlarged aperture and freely slidable lengthwisely of the arm. An anchor member releasably anchors the wheel support arm orthogonally to the boom. The anchor member includes another wheel retainer, so that opposite lower sides of the disabled car wheel tire tread be taken in sandwich therebetween, thus positively locking the wheel to the towing apparatus.

5 Claims, 4 Drawing Sheets

TOWING APPARATUS WITH MULTIPLE ADJUSTMENTS WHEEL RETAINERS

FIELD OF THE INVENTION

This invention relates to implements attached to the rear of a first motor vehicle to lift and tow the front or rear end of a disabled motor vehicle.

BACKGROUND OF THE INVENTION

U.S. Pat. No. 4,637,623 issued 20 Jan. 1987 to Vulcan Equipment Company, Ltd (inventor: Leslie Bubik) discloses a towing apparatus for lifting and towing a vehicle. The towing apparatus is to be mounted to a telescopic boom, attached to the rear of a motorized towing vehicle. The towing apparatus includes an elongated support beam, to be positioned transversely below the vehicle to be towed, and two wheel support members each consisting of an elongated arm and a transverse wheel retainer, with each support member arm being pivoted by a pivot mount along a vertical axis to corresponding opposite ends of the support beam. The pivot mount of the support member arm enables rotation of the wheel support arm from a laterally outward position relative to the support beam, to a position generally perpendicular to the elongated support beam. The wheel retainer part of the support member is adapted to fit and transversely engage the rear section of a wheel tire tread from a vehicle to be towed.

In operation, the towing vehicle of the Bubik patent moves backward toward a disabled vehicle to be towed, with the wheel support members being spread laterally outwardly to clear the wheels of the disabled vehicle. As the transverse support beam comes to abut against the front tread portion of the disabled vehicle front wheels, the wheel support member is pivoted inwardly from its laterally outward position, to a position where the wheel support arm extends generally parallel to the disabled vehicle wheel and laterally outwardly thereof and where the wheel support retainer abuts against the rear tread section of the disabled vehicle tire.

One drawback of such a device is that the level of adjustment available at the wheel retainer section is not as high as one would like. This is due to the fact of the permanent pivotal mount of the wheel support member to the transverse boom. A second drawback is that the wheel support arm and wheel retainer are permanently mounted by a vertical pivot mount to the transverse boom, thus increasing the likelihood of weatherborne and other frame body damages.

OBJECTS OF THE INVENTION

The main object of the invention is to provide a towing apparatus with enhanced adjustment capability at the wheel retainer section thereof.

A more specific object of the invention is that the towing apparatus includes a transverse wheel support arm that is releasably engaged through an elongated end aperture in the transverse boom for free lengthwise sliding motion therethrough in the transverse boom; and that the wheel support arm be releasably anchored perpendicularly to the transverse boom by a shoe locking member.

A further object of the invention is that the wheel support member be an unattached separate element of the towing apparatus, being attached thereto only when the shoe locking member is mounted thereto during operative attachment to a disabled vehicle wheel.

A general object of the invention is to improve upon the known towing apparatuses by providing a wheel support member not being pivoted vertically to the transverse beam of the towing apparatus main frame.

SUMMARY OF THE INVENTION

In accordance with the objects of the invention, there is disclosed a towing apparatus for lifting and towing a disabled vehicle, comprising:

(a) an elongated boom having at each end portion an elongated aperture at each end portion thereof, said boom adapted to be connected intermediate its ends with a hitch bar;

(b) a pair of wheel support members, each defining an elongated arm and a first wheel retainer at an outer end of said elongated arm, said first wheel retainer for engaging a first lower sector portion of a tire tread from the disabled vehicle; a said elongated arm releasably axially engaging through a corresponding said aperture of the elongated boom for free displacement both lengthwisely of said boom along said elongated aperture and transversely thereof; and (c) a pair of shoe assemblies, each to be releasably mounted over a corresponding end portion of said boom, each shoe assembly comprising a main web, for releasably abutting a top surface of said boom end portion, a pair of elbowed arms, transversely carried by said main web for releasably engaging a bottom portion of said wheel support elongated arm, a second wheel retainer carried laterally of said main web opposite said elbowed arms for engaging in an operative position a second lower portion of the tread of a wheel tire of the disabled vehicle, wherein the first and second lower portions of wheel tire treads are on opposite sides thereof, an elbowed tab, depending from said second wheel retainer for releasably engaging an edge of said top surface of boom end portion, and a locking means for releasably interlocking said main web and said wheel support elongated arm in said operative position to prevent relative movement thereof.

Preferably, said locking means includes: (a) a number of first bores, lengthwisely positioned along said main web; (b) a number of second bores, lengthwisely positioned along said wheel support elongated arm; and (c) a locking pin, releasably engageable through a selected pair of one said first bore and of one said second bore.

It is envisioned to add a knurled surface on the top surface of the lower leg of the outer end portions of the transverse main boom 16, said knurled surface for promoting friction fit engagement between a given wheel support arm and the boom.

Alternately or concurrently, there could also be added an embossed surface on an interior (tire-facing) wall of each arcuate sheet wheel retainer, to ensure positive friction fit engagement between the wheel retainer and the tire tread.

DETAILED DESCRIPTION OF THE EMBODIMENTS OF THE INVENTION

Figure 1:
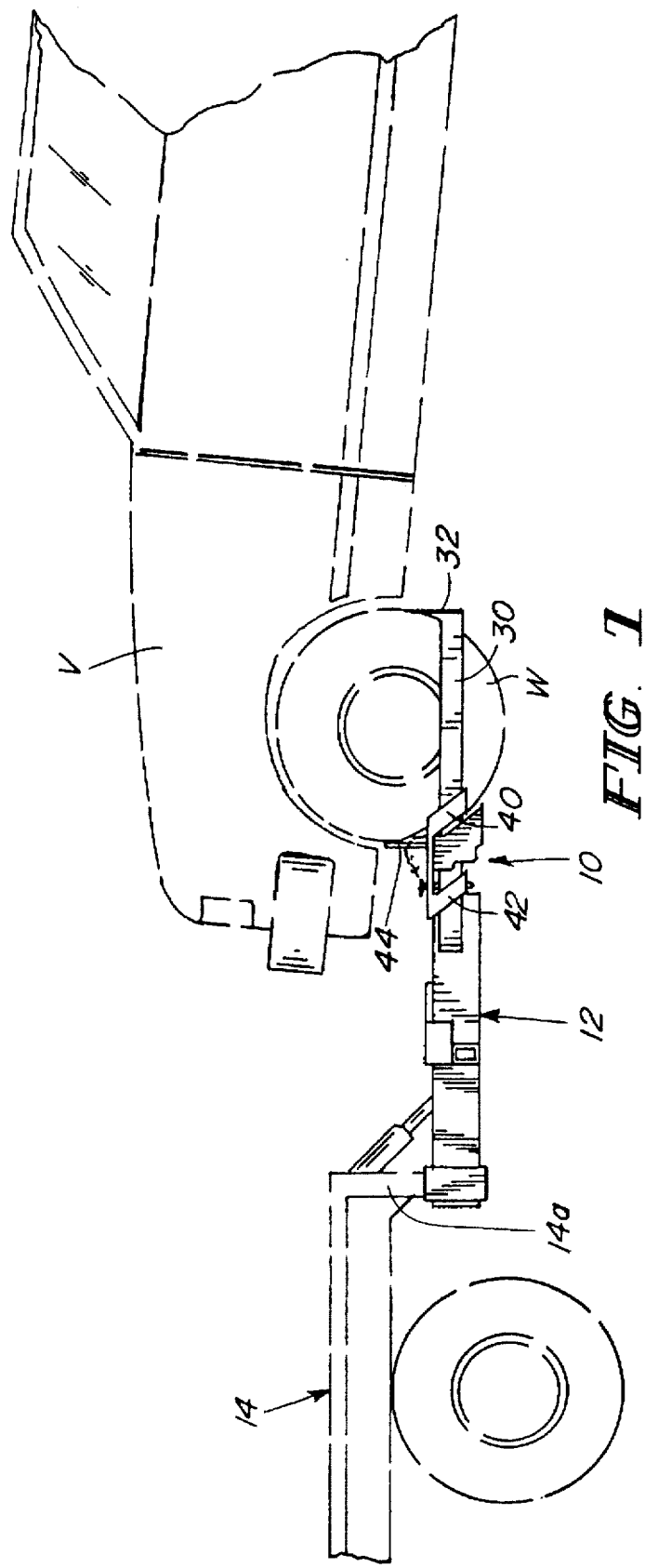
FIG. 1 is a side elevational view of the front portion of a disabled vehicle, shown in phantom lines and being raised and supported by a towing apparatus according to a preferred embodiment of the invention.
Figure 2:
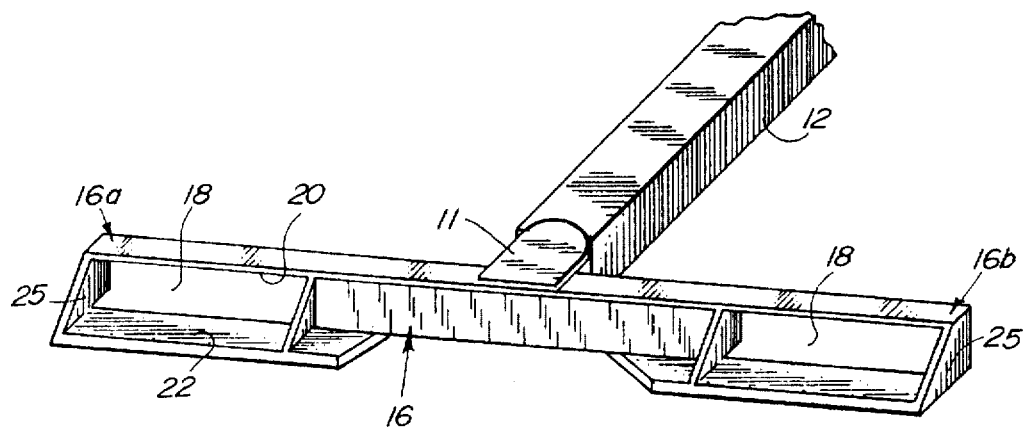
FIG. 2 is an isometric view of the main frame of the present towing apparatus, also showing the connection means for the transverse hitch beam adapted to be mounted to the main boom.

As illustrated in FIGS. 1–2, the towing apparatus 10 is to be attached to a hitch beam 12, the hitch beam being in turn attachable to the rear chassis section 14a of a motorized tow truck 14 by known hydraulic coupling means (not detailed). The towing apparatus 10 includes a main elongated boom 16, having connecting means 11 intermediate its ends for transverse attachment to hitch beam 12. Boom 16 has at each end portion 16a, 16b, an elongated rectangular aperture 18, 18. Each end portion 16a, 16b, of the boom 16 includes a top rectangular leg 20, a bottom rectangular leg 22 and a laterally outer end wall 25, all circumscribing the apertures 18, 18, respectively, with the top and bottom legs 20 and 22 being vertically offset (leg 22 being opposite the side of beam 12) and with the bottom leg 22 being wider than the top leg 20.

Figure 3:
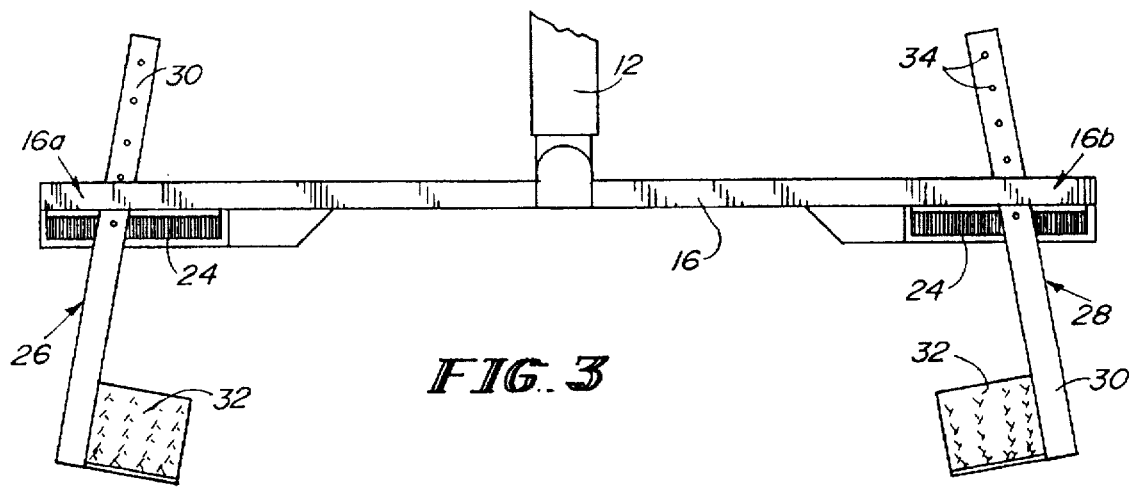
FIG. 3 is a top plan view of the main frame and associated pair of wheel support members being releasably engaged thereto.

As shown in FIG. 3, two separate wheel support members 26 and 28, are further provided, each a mirror-image of the other and consisting of an L-shape integral structure including an elongated tubular arm 30 and a transverse enlarged wheel retaining panel 32 at one end of the tubular arm 30. The wheel retaining panel 32 forms an arcuate quadrangular rigid sheet, sized to releasably fit flatly against a tread portion of a wheel tire. The elongated tubular arm 30 of the wheel support is cross-sectionally sized to freely engage axially through the end aperture 18 of the elongated transverse boom 16, and to transversely slide lengthwisely of the elongated aperture 18 of boom 16 or to freely tilt into aperture 18 without any pivotal connection mount to the boom end portion 16a or 16b.

Figure 5:
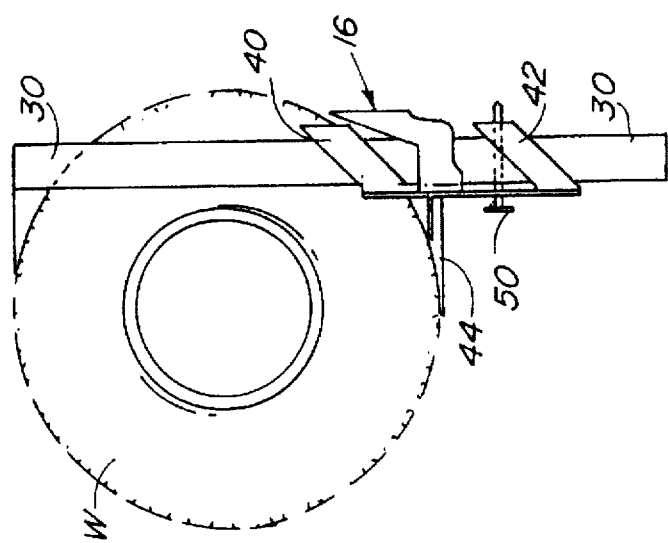
FIG. 5 is a view similar to FIG. 4 but at a smaller scale and more schematic and with the locking shoe being directly anchored in position to the wheel support arm by a locking pin.

Tubular arm 30 should have a length greater than the diameter of the wheel W of the vehicle V to be towed (see FIG. 5). Elongated arm 30 includes a number of lengthwisely-spaced bores 34 at its inner end portion opposite wheel retainer 32, for a purpose later set forth.

Figure 4:
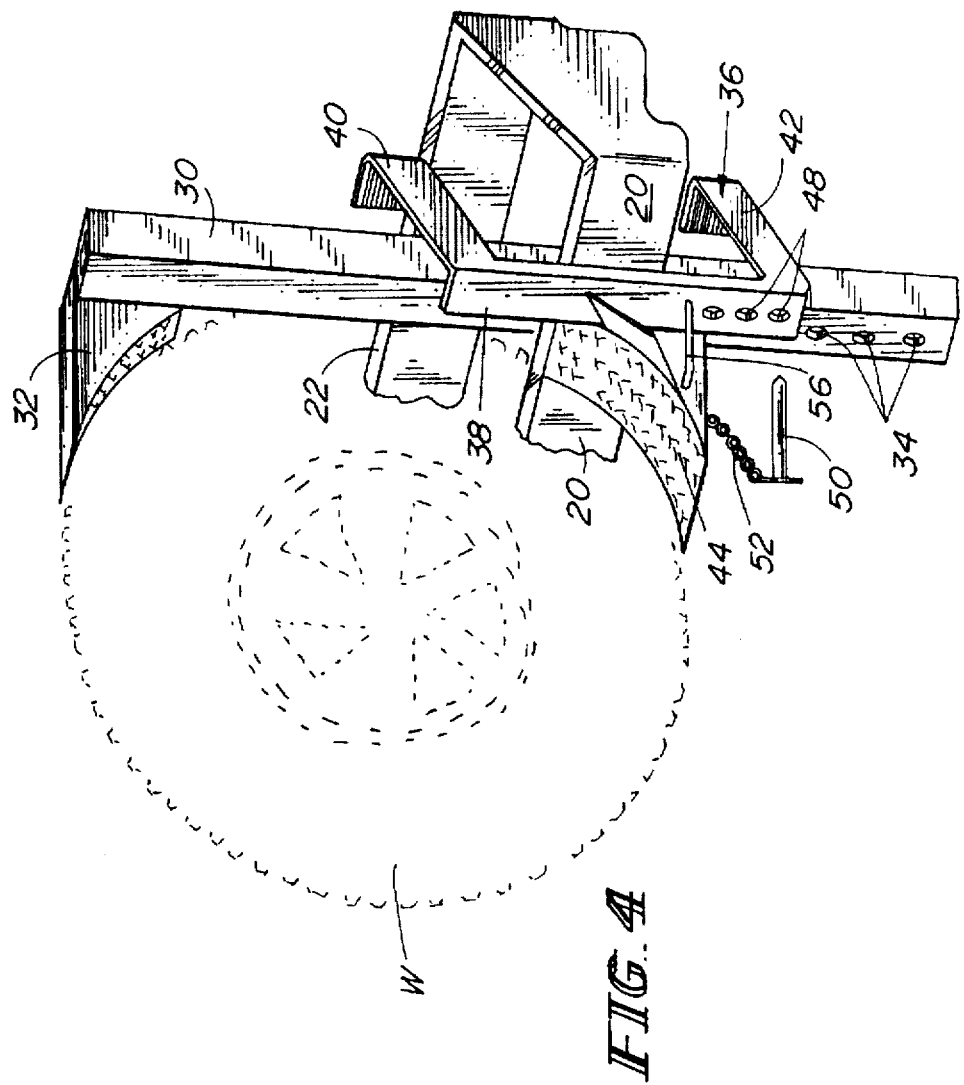
FIG. 4 is an elevational view of a wheel in phantom lines, and in isometric view a wheel support member, a corresponding section of the main frame transverse beam, and the locking shoe, with the locking shoe shown in spaced overlying fashion relative to the wheel support arm.
Figure 6:
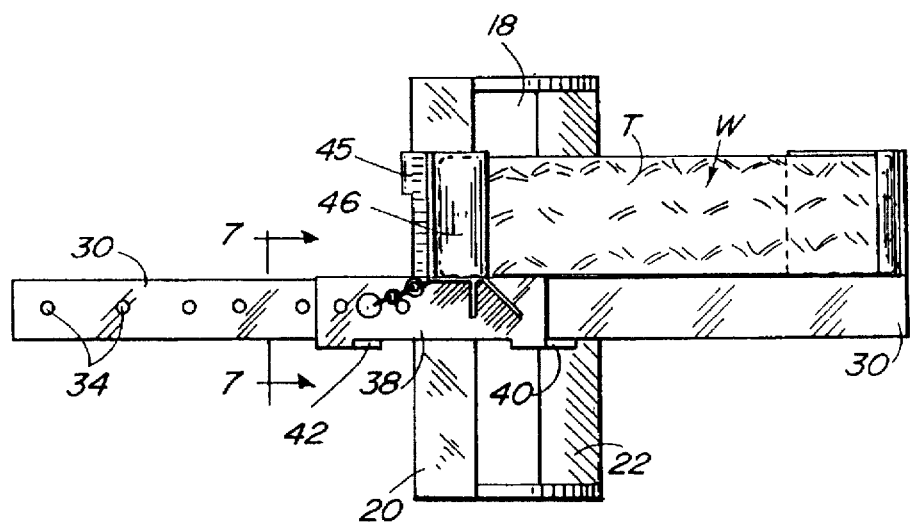
FIG. 6 is a top plan view of the elements of FIG. 4.

As suggested in FIGS. 4 and 6, the arcuate shape of the wheel retainer 32, at the outer end of the wheel support arm 30, makes the latter adapted to snugly fit against a sector portion of the wheel tire tread T.

As best seen in FIGS. 4–7 of the drawings, a third separate element is provided as part of the present towing apparatus 10, and consists of a shoe member 36 having a U-shape section including a main web 38, and two axially aligned, downturned, elongated, transverse C-shape flanges 40, 42, integrally carried by the main web 38. A third downturned shallow C-shape flange or tab 45 is provided transversely to the main web 38, extending away from the two flanges 40 and 42 and orthogonally to the general plane defined by these two first flanges 40 and 42. An upturned arcuate quadrangular wheel retainer plate 44 is further mounted to main web 38 adjacent third shallow flange 45 and in overlying fashion relative thereto. The web or top leg 38 of the shoe or locking member 36 includes a few bores 48, one of which being adapted to come in register with a selected one of the bores 34 from the wheel support arm 30. A locking pin 50 is loosely attached with a chain 52 to the wheel retainer 44, and is destined to releasably engage one bore 48 and a selected one of the wheel support arm bores 34, to further prevent the wheel support arm 30 from moving lengthwisely of web 38. Such interlocking between the support arm 30 and boom 16 occurs to anchor same in relative orthogonal fashion, since the three downturned flanges 40, 42 and 45 engage edge portions of the wheel retainer arm 30 and of the boom 16, respectively, thus precluding accidental laterally outward motion of the wheel support arm 30. Moreover, in such a condition, the wheel retainer arm 30 cannot pivot interiorly around the locking pin 50, since the two opposite wheel retainer plates 32 and 44 already abut flatly against opposite tread sections of the wheel tire of the vehicle to be towed. However, when wheel retainers 32 and 44 do not engage a disabled car wheel W, laterally outward sliding motion of locking member 36 orthogonally of the lengthwise axis of the wheel retainer arm 30 is not prevented (although laterally outward pivotal motion thereof is prevented by tab 45 on boom 20) when pin 50 is inserted into bores 48 and 34, thus affording enhanced adjustment capability.

Hence, when as in FIG. 4, the inner wheel retainer 44 engages the tire tread, laterally outward rotation of the wheel support arm 30 is not possible due to the abutting engagement of retainer 44 on tire W. The only way to enable release of the wheel support arm 30 is:

(a) first, to release pin 50, so that wheel support arm 30 be axially movable relative to shoe 36;

(b) second, to axially move arm 30 orthogonally of boom 16 so as to spread apart the two wheel retainers 32 and 44;

(c) third, to slide wheel support arm 30 sideways i.e. lengthwisely of aperture 18, or to tilt same through aperture 18 so that the wheel retainers 32 and 44 be brought vertically out of register from the disabled car wheel W;

(d) fourth, to remove the shoe 36;

(e) fifth, to remove the wheel support member 30, 32, altogether.

It is therefore noted that the wheel support member 26 or 28 is not mounted, pivotally or otherwise, directly to the transverse main boom 16, but only indirectly by the shoe locking member 36; and this locking member 36 operates mainly by friction fit interlock between the wheel retainer arm 30 and the corresponding boom end portion 16a or 16b. The purpose of the locking pin 50 is not to enable pivotal motion of wheel support arm 30 relative to the boom 16, but rather to interlock arm 30 and boom 16 to prevent further fore and aft motion of the wheel support member 26 or 28, cooperatively with flanges 40, 42, and tab 45.

Preferably, and as suggested in FIG. 3 of the drawings, there is a knurling 24 on the top surface of the lower leg of the outer end portions 16a, 16b, of the transverse main boom 16, said knurling for promoting friction fit engagement between the wheel support arm 26 or 28 and the boom 16. Similarly, and as suggested in FIG. 6 of the drawings, on the interior (tire facing) wall of each arcuate sheet wheel retainer 32, 44, there is preferably provided an embossed surface, to ensure positive friction fit engagement between the wheel retainer and the tire tread when they come in contacting engagement.

Figure 7:
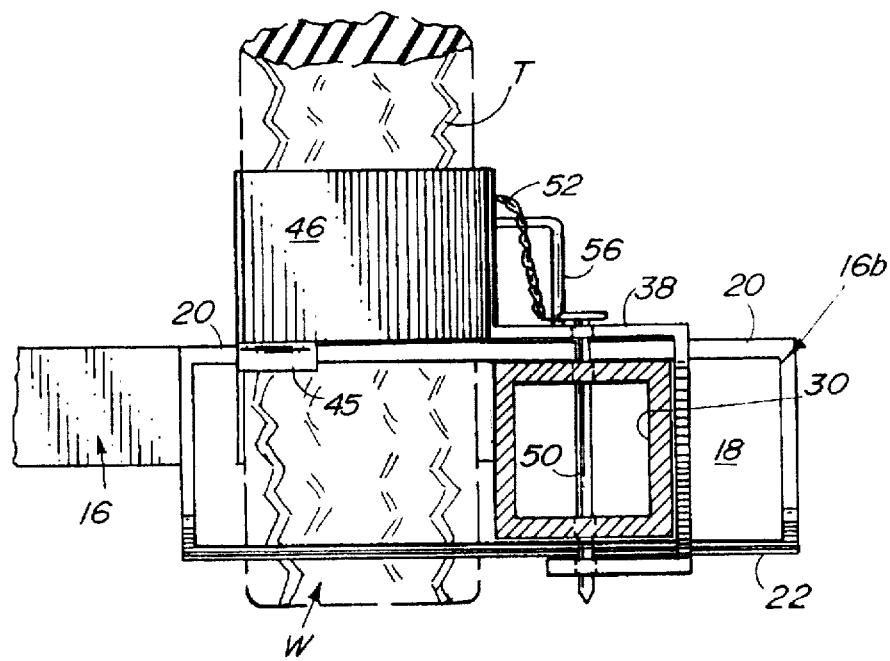
FIG. 7 is a sectional view at an enlarged scale taken along line 7—7 of FIG. 6.

As illustrated in FIGS. 4 and 7, to facilitate handling of the towing apparatus 10, and particularly when it is desired to release the towing apparatus from its operative anchoring condition from a disabled car wheel, there is preferably provided a L-shape handle, 56, formed from a bent rod anchored at one end laterally to wheel retainer 44 and at the other end to the top surface of shoe web 38. Hence, by upwardly pulling the pin 50 and by thereafter laterally outwardly pulling the handle 56, the shoe 36 is released from the wheel support arm 30. It is then possible to move this arm 30, e.g. with the feet, axially to clear the wheel retainers and then away from the disabled car wheel W, so that the two wheel retainers 32, 44, be made to move out of register from the wheel.

Clearly, such a wheel retaining assembly being formed of two opposite wheel retainers 32, 44, of a wheel support arm 30, and of an end portion of a boom 16, all interlocked by a releasable pin 50 engaging the shoe member 36 and the wheel support arm 30, does provide multiple adjustment capability upon temporary release of the pin 50, while providing secure interconnection of the disabled vehicle wheel and towing apparatus.

It is understood that wheel support member 30, 32, is not normally attached (pivotally or otherwise) to boom 16, unless in use with shoe member 36 to mount a vehicle wheel W, so that support member 30, 32, can be easily released from boom 16, and stored e.g. inside the trunk of the towing vehicle with the shoe member 36. This will extend the useful lifetime of the towing apparatus elements, weatherwise, and will decrease the likelihood of damage from accidental impact with other vehicles and buildings, when not in use, since it is not permanently attached to the transverse boom as in prior art towing apparatuses.

Preferably, the arcuate wheel retainer plate 44 will further include a downward arcuate coextensive extension, not illustrated, projecting slightly beneath the horizontal plane intersecting the top leg 20 of boom 16, but well short of the bottom leg 22 thereof. Such an extended wheel retainer plate 44 should provide improved wheel mounting to the wheel support members 26 and 28.

Also, there could be provided a second locking pin, not illustrated but similar to pin 50, to engage another bore 48 from bar 38 and selected bore 34 from arm 30. A pair of locking pins 50 would provide firmer anchoring of shoe 36 to retainer arm 30.

Furthermore, it would be envisioned that at least one of the bores of top leg 38 of shoe 36 be ovoidal (not shown), instead of circular as in the previous bores 48. Such ovoidal bore would extend longitudinally of the leg 38, so that the pin 50 be slidable lengthwisely therealong. This ovoidal bore would therefore facilitate easier installation of the locking pin 50 to the wheel retainer assembly in sometimes difficult road environments (with snow, ice, mud and the like), in that location of the ovoidal bore and engagement by the pin would be less troublesome.

I claim:

1. A towing apparatus for lifting and towing a disabled vehicle, comprising:
   (a) all elongated boom having at each end portion thereof an elongated aperture, said boom having means intermediate its ends for connection with a transverse hitch beam;
   (b) a pair of wheel support members, each defining an elongated arm and a first upright wheel retainer mounted transversely thereof at an outer end of said elongated arm, said first wheel retainer for engaging a first lower sector portion of a tire tread from a corresponding wheel of the disabled vehicle; a said elongated arm releasably axially engaging through a corresponding said aperture of the elongated boom for free displacement both lengthwisely of said boom along said elongated aperture and transversely thereof; and
   (c) a pair of shoe assemblies, each releasably mountable in an operative position over a corresponding end portion of said boom, each shoe assembly comprising a main web, four releasably abutting a top surface of said boom end portion, a pair of downturned elbowed arms, transversely carried by said main web for releasably engaging a bottom edge portion of said wheel support elongated arm, a second upright wheel retainer carried laterally of said main web opposite said elbowed arms for engaging a second lower sector portion of the tread of the tire of the disabled vehicle, with the first and second lower sector portions of the tire treads being opposite one another, an elbowed tab, downwardly depending from said second wheel retainer for releasably engaging an edge portion of said top surface of said boom end portion, and a locking means for releasably interlocking said main web and said wheel support elongated arm in said operative position to prevent relative movement thereof, wherein the two wheels of the disabled vehicle are adapted to be positively anchored to said towing apparatus upon said shoe assemblies being brought to their said operative positions.

2. A towing apparatus as defined in claim 1, wherein said locking means includes:
   (a) a number of first bores, lengthwisely positioned along said main web;
   (b) a number of second bores, lengthwisely positioned along an inner end portion of said wheel support elongated arm opposite said outer end thereof; and
   (c) a locking pin, releasably engageable through a selected pair of one of said first bores and of one of said second bores.

3. A towing apparatus as defined in claim 1, wherein each of said boom end portions includes top and bottom legs spaced from one another, and further including an embossed surface on an interior wall, adapted to face a tire, of each said first and second wheel retainer, to ensure positive friction fit engagement between the wheel retainer and the tire tread.

4. A towing apparatus as defined in claim 3, wherein said bottom leg of each said boom end portion is vertically offset relative to said top leg thereof, in a direction opposite said hitch beam connection mount.

5. A towing apparatus as defined in claim 4, further including a knurled surface on the top surface of said bottom leg of the outer end portions of said elongated boom, said knurled surface for promoting friction fit engagement between a given wheel support arm and said boom.

* * * * *